US012224516B2

(12) United States Patent
Lüttermann

(10) Patent No.: US 12,224,516 B2
(45) Date of Patent: Feb. 11, 2025

(54) MOUNTING HOUSING FOR PLUG-IN CONNECTIONS

(71) Applicant: HARTING Electric Stiftung & Co. KG, Espelkamp (DE)

(72) Inventor: Dieter Lüttermann, Rahden (DE)

(73) Assignee: HARTING Electric Stiftung &Co. KG, Espelkamp (DE)

( * ) Notice: Subject to any disclaimer, the term of this patent is extended or adjusted under 35 U.S.C. 154(b) by 401 days.

(21) Appl. No.: 17/774,271

(22) PCT Filed: Nov. 19, 2020

(86) PCT No.: PCT/DE2020/100979
§ 371 (c)(1),
(2) Date: May 4, 2022

(87) PCT Pub. No.: WO2021/104568
PCT Pub. Date: Jun. 3, 2021

(65) Prior Publication Data

US 2022/0393386 A1 Dec. 8, 2022

(30) Foreign Application Priority Data

Nov. 25, 2019 (DE) ..................... 10 2019 131 714.2
Feb. 14, 2020 (DE) ..................... 10 2020 103 896.8

(51) Int. Cl.
*H01R 13/506* (2006.01)

(52) U.S. Cl.
CPC ................................ *H01R 13/506* (2013.01)

(58) Field of Classification Search
None
See application file for complete search history.

(56) References Cited

U.S. PATENT DOCUMENTS

| | | | | |
|---|---|---|---|---|
| RE31,462 | E | 12/1983 | McCormick et al. | |
| 4,440,464 | A | 4/1984 | Spinner | |
| 10,473,866 | B2 * | 11/2019 | Newbury ............. | G02B 6/4472 |
| 2005/0186822 | A1 | 8/2005 | Serino et al. | |
| 2012/0071019 | A1 | 3/2012 | Takamatsu | |
| 2012/0164870 | A1 | 6/2012 | Murphy et al. | |
| 2019/0341729 | A1 * | 11/2019 | Gniadek .............. | G02B 6/3891 |

FOREIGN PATENT DOCUMENTS

| | | | |
|---|---|---|---|
| DE | 3022102 | C1 | 11/1981 |
| DE | 102013111321 | A1 | 4/2015 |
| DE | 102017104029 | A1 | 8/2018 |
| DE | 102019120868 | A1 | 2/2020 |
| JP | 2006302545 | A | 11/2006 |
| JP | 2012068323 | A | 4/2012 |
| WO | 2011006154 | A1 | 1/2011 |

* cited by examiner

*Primary Examiner* — Ross N Gushi
(74) *Attorney, Agent, or Firm* — Smartpat PLC

(57) ABSTRACT

Add-on housing for a plug-in connection, which add-on housing has a housing side with at least one first fastening form and a plug-in side with at least one holding form, wherein a flange is arranged between the housing side and the plug-in side, which flange is provided for attaching the add-on housing to an appliance housing, wherein the plug-in side has at least two holding forms, at least one first holding form and at least one second holding form.

8 Claims, 4 Drawing Sheets

MOUNTING HOUSING FOR PLUG-IN CONNECTIONS

TECHNICAL FIELD

The disclosure relates to an add-on housing for plug-in connectors. Add-on housings of this kind are required, for example, in order to connect electrical lines to devices, for example switch cabinets or industrial appliances and/or machines, in a detachable manner.

BACKGROUND

Various solutions for the detachable connection of electrical lines in the form of cables to devices and associated housings are known in the prior art. For this purpose, cables with plug-in connectors are provided which are coupled to corresponding mating plug-in connectors and/or add-on housings.

However, when connecting devices such as switch cabinets and machines, different connection mechanisms to those used for connecting sensors or data transmission elements are frequently requested. Particularly in the case of data transmission elements, there are various connection mechanisms for securing a data line to a corresponding component. In particular, latching elements such as those known from commercially available LAN cables or patch cables with a cable terminal are known in the art. These are usually Ethernet cables with different insulation and shields and the plug-in devices known as RJ-45. These RJ-45 plug-in devices can usually be locked in a corresponding add-on housing using a simple, spring-loaded latching element. In order to release the connection, pressure is exerted on the latching element, for example, and a tensile force is simultaneously exerted against the plug-in direction. In industry, apart from this latching element, latching elements are primarily known which engage with the connecting element in the add-on housing during a plug-in movement of the cable and can be removed again by pulling on the connecting element against the plug-in direction. Plug-in connectors with this kinematics are known as push-pull connectors.

Furthermore, there are latching elements which are provided with a circumferential flexible locking lip, or circumferential locking plates, which are fitted onto an add-on housing, where they engage with a likewise circumferential elevation or depression. These kinds of latching elements are usually referred to as snap-collar or also snap-in locking.

The two latching elements described above incorporate certain advantages and disadvantages and are widespread, particularly in the industrial field of application.

However, the disadvantage of the prior art is, in particular, the lack of compatibility between the latching elements and the add-on housings required in each case. Since data transmission contacts which frequently resemble one another are provided with the described plug-in devices which differ from one another and have latching elements, it is desirable for different embodiments of the latching elements to be able to be fitted onto a uniform add-on housing.

The German Patent and Trademark Office has conducted a search of the following prior art in the priority application of the present application: DE 10 2019 120 868 A1, WO 2011/006154 A1 and DE 10 2013 111 321 A1.

SUMMARY

The disclosure provides an add-on housing for electrical plug-in connectors which receives multiple latching elements, which have the same kind of plug-in connectors and which differ from one another, properly and securely.

The disclosure is based on an add-on housing for an electrical plug-in connection, which add-on housing has a housing side with at least one first fastening form and a plug-in side with at least one holding form, wherein a flange is arranged between the housing side and the plug-in side, which flange is provided for attaching the add-on housing to an appliance housing, and wherein the add-on housing has at least one through-hole along the longitudinal axis of the add-on housing, which is designed to receive an insulating body with contact elements located therein, wherein the plug-in side has at least two holding forms, at least one first holding form and at least one second holding form. By means of this embodiment it is possible to ensure that two electrical plug-in connectors, for example, with an identical insulating body and the contact elements contained therein, but differently configured latching elements, can be attached to an add-on housing. In this way, the manufacturer's production costs are lowered, since for various latching elements and latching devices, a single housing and customer benefits are similarly increased.

One embodiment is based on an add-on housing for an electrical plug-in connection, which add-on housing has at least one first holding form and at least one second holding form, wherein the at least one first holding form differs from the at least one second holding form. This embodiment allows differently configured latching elements to be used with a comparable, in particular identical, insulating body. By way of example, in this way plug-in connectors, for example of the push-pull connector kind, and plug-in connectors of the snap-in kind, can be connected to an add-on housing according to the invention. This means that two plug-in connectors which differ from one another are fitted with an identical insulating body, which plug-in connectors are brought into engagement with an insulating body in the through-hole of the add-on housing. These plug-in connectors may have different latching elements within, or along, the housing and nevertheless be received by the add-on housing according to the invention.

A particularly skillful embodiment proposes an add-on housing for an electrical plug-in connector, wherein at least one first holding form is formed to receive at least one first latching element of a first plug-in connector, and wherein at least one second holding form is formed to receive at least one second latching element of a second plug-in connector. This means that the add-on housing has a circumferential bead on the plug-in side, for example, which bead is formed to allow a snap-in plug-in connector to engage. In addition, the add-on housing has a groove for receiving a latching element, for example, wherein the latching element must be assigned to a push-pull connector, for example. Latching elements of other kinds of plug-in connectors are of course also conceivable.

A logical embodiment proposes an add-on housing for an electrical plug-in connection, wherein the position of the first holding form on the plug-in side differs from the position of the second holding form on the plug-in side along the longitudinal axis of the add-on housing.

This means that, for example, a bead for a snap-in connector does not immediately follow a groove for a latching hook, for example a push-pull connector, but an interval of, for example, half the length of a holding form such as a groove, or of a holding form such as a bead, is kept between the at least two holding forms.

A skillful embodiment proposes an add-on housing for an electrical plug-in connection, wherein the first holding form is formed on the plug-in side in such a manner that a latching element of a plug-in connector is brought into engagement as a snap closure with the first holding form of the add-on housing. The first holding form is therefore designed in particular for a snap closure, also referred to as a snap-in connector. The embodiment proposes an add-on housing for an electrical plug-in connection, wherein the first holding form is preformed on the plug-in side as an elevation and/or bead. For this purpose, a circumferential bead is usually preformed in the plug-in region of the add-on housing. Likewise, the first holding form may be configured as a circumferential, point-shaped form, for example as circumferential, (partially) spherical elevations. In this case, it is pertinent to the use of a snap closure that the snap-on collar of the snap closure must be briefly extended to a larger diameter, at least during the plug-in progress, so that it can subsequently lock behind a corresponding holding element through a reduction in diameter.

A further embodiment proposes an add-on housing for an electrical plug-in connection, wherein the second holding form is formed in such a manner that a latching element of a plug-in connector is brought into engagement with the second holding form of the add-on housing as a latching closure. The embodiment proposes an add-on housing for an electrical plug-in connection, wherein the second holding form is preformed on the plug-in side as a depression and/or groove. In this case, in particular, the latching closure should be understood to be at least one latching hook which engages with a holding form, for example, in other words a groove, in particular. In the case of a push-pull plug-in connector, this latching hook can be lifted out of the second holding form, such as a groove, by a retrieval element, or it can be lifted above a second holding form, as a result of which the connection can be released again. So-called push-pull latching elements of plug-in connectors normally use a groove in order to countersink a latching lug in the groove. This latching lug is lifted out of the groove by pulling the plug-in housing, as a result of which the plug-in connector can be removed from the add-on housing.

Finally, one embodiment envisages an add-on housing for an electrical plug-in connection, wherein the through-opening has a further form which is configured to receive at least one third latching element that differs from the first latching element and the second latching element. In this case, a form which is initially provided for the purpose of securing the plug according to the poka-yoke principle is provided, furthermore for receiving a further latching element. For this purpose, a depression for receiving a latching lug, such as in the case of current RJ-45 plug-in connectors, for example, can be incorporated and/or excluded.

The disclosure is further based on a plug-in connector system consisting of an add-on housing for an electrical plug-in connection according to the invention and a corresponding plug-in connector with latching element, wherein the add-on housing is designed optionally to receive a first plug-in connector with a first latching element, or a second plug-in connector with a second latching element. In this case, the first latching element of the first plug-in connector differs from the second latching element of the second plug-in connector. Logically, the add-on housing has a through-hole which receives an insulating body and contact elements which correspond to the insulating body and the contact elements of both plug-in connectors.

The plug-in connector system having an add-on housing according to the invention for an electrical plug-in connection is sensibly expanded, in that the add-on housing is designed to receive a third plug-in connector with a third latching element, wherein the third latching element differs from the first latching element and the second latching element. In this way, an add-on housing can be offered which, on the one hand, receives a plug-in connector with a snap collar lock, also referred to as a snap-in lock. Furthermore, plug-in connectors with latching hooks engaging on the outside of the plug-in region of the add-on housing, particularly known as push-pull locks, are also received. In addition, plug-in connectors can moreover be connected to latching hooks engaging with the add-on housing from within, in a similar manner to the locks of a commercially available RJ-45 plug-in connector known in the art.

BRIEF DESCRIPTION OF THE DRAWINGS

An exemplary embodiment of the invention is illustrated in the drawings and will be explained in greater detail below.

FIG. 3 shows a detail of an add-on housing with the snap-collar connector plugged in.

FIG. 4 shows a detail of an add-on housing with the push-pull connector plugged in.

DETAILED DESCRIPTION

The figures contain partially simplified schematic representations. Identical reference signs are used for the same, but possibly not identical, elements. Different views of the same elements could be scaled differently.

Directional indications such as “left”, “right”, “up” and “down” are to be understood with reference to the respective figure and can vary in the individual representations with respect to the represented object.

Figure 1:
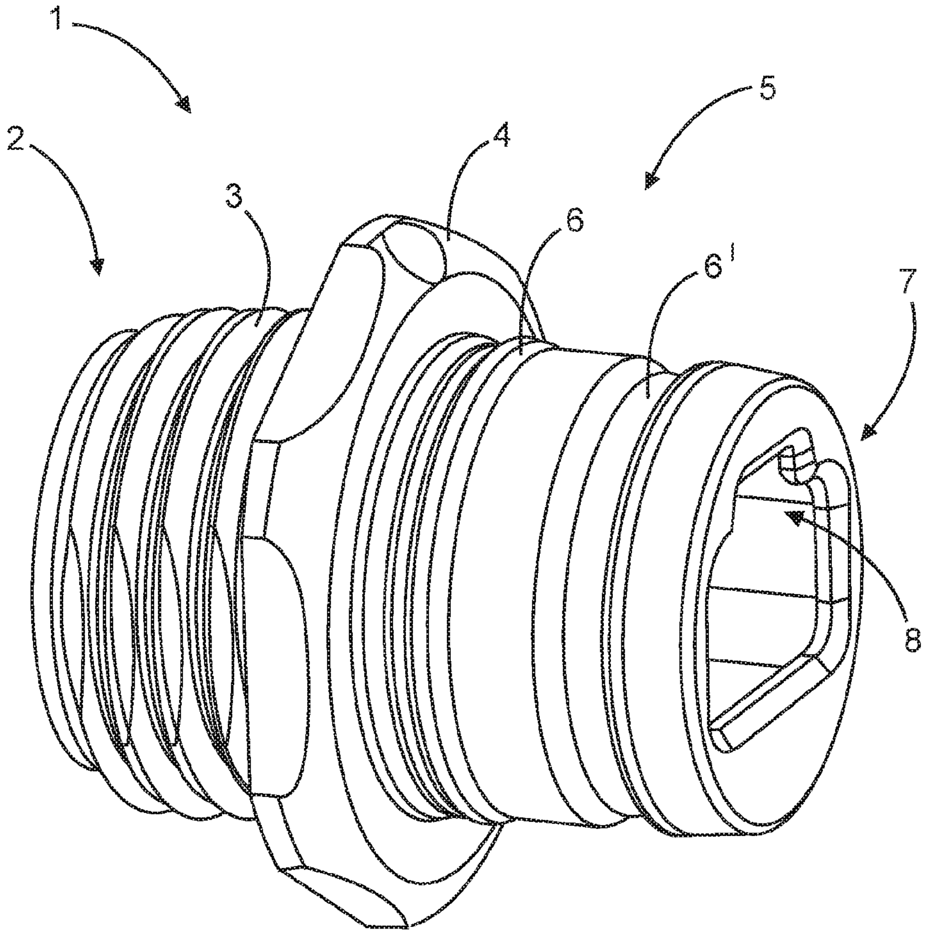
FIG. 1 shows a perspective representation of an add-on housing.

FIG. 1 shows an add-on housing 1 according to the invention with a housing side 2 and a fastening form 3 located thereon. The fastening form 3 is designed as a thread. Other fastening forms, for example hooks, barbs or similar variants, are likewise conceivable and feasible. The housing side 2 is separated from the plug-in side 5 by a flange 4. The plug-in side 5 in this case has a first holding form 6 and a second holding form 6'. Moreover, a through-hole 7 can be seen. This through-hole 7 is designed to receive an insulating body (not shown) and contact elements (not shown) contained therein. The holding form 6 in this case is a circumferential elevation. To be more precise, the holding form 6 is a preformed bead. In order to reinforce the effect of the holding form 6, a depression may be provided between the holding form 6 and the flange 4. The holding form 6' is a circumferential depression. This holding form 6' may be configured as a recess, in particular as a groove. Finally, the through-opening 7 is also provided with a recess 8. This recess 8 is at least provided to prevent an accidental and/or false orientation of a plug-in connector 10 or 10' on the add-on housing 1. A further recess, groove, opening can be skillfully inserted within and/or omitted from the recess 8, in order to allow a further latching element of a further plug-in connector to engage, in order to detachably connect said plug-in connector to the add-on housing 1.

Figure 2:
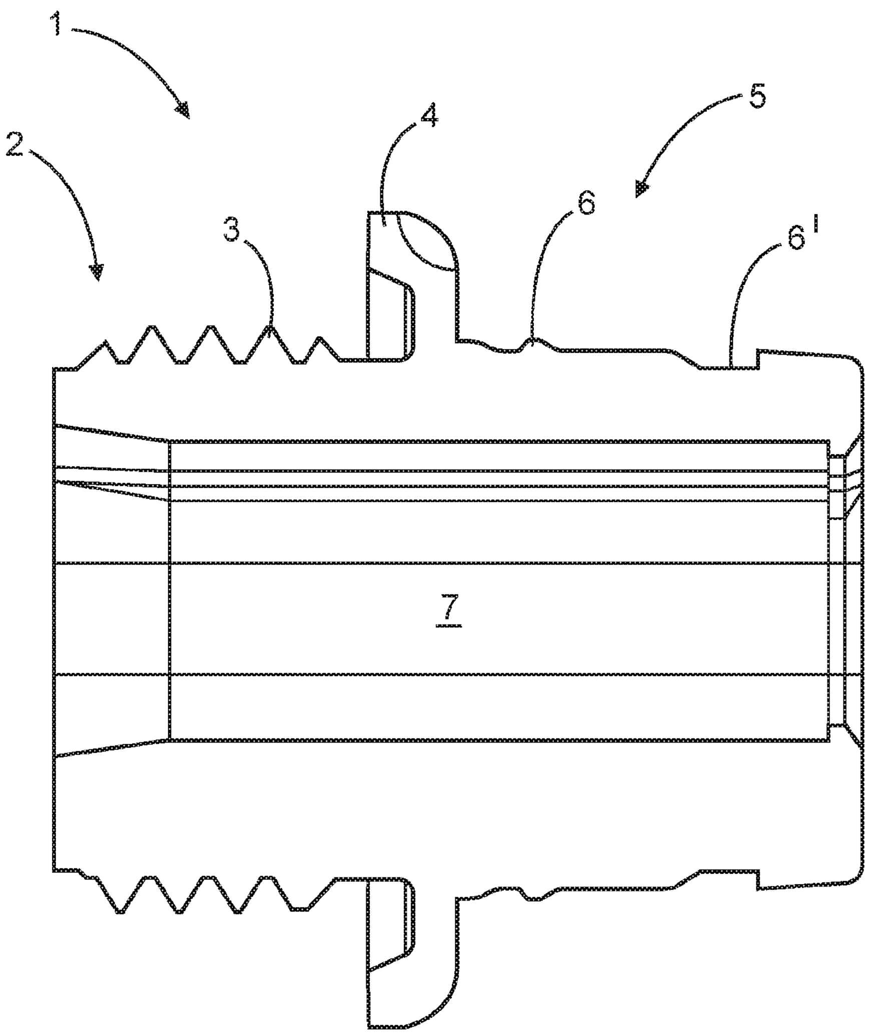
FIG. 2 shows a representation of the add-on housing in longitudinal section.

FIG. 2 shows a cross section along the longitudinal axis of the add-on housing 1. It is clear from this that the holding forms 6 and 6' adopt different positions along the longitudinal axis. In this way, latching elements configured in different ways can be received. Moreover, this spacing of the holding element 6 and of the holding element 6', in particular, prevents a latching element provided for the holding element 6 from becoming permanently connected to the holding element 6' in an incorrect manner. The design of push-pull connectors and snap-in connectors, which differs in principle, means that the arrangement makes absolute sense. Push-pull connectors usually require more space or more ways to allow a latching element 11'/13, which is used, to engage with a holding form 6' than is required, for example, by a snap-in connector with a holding form 6 provided therefor.

Figure 3:
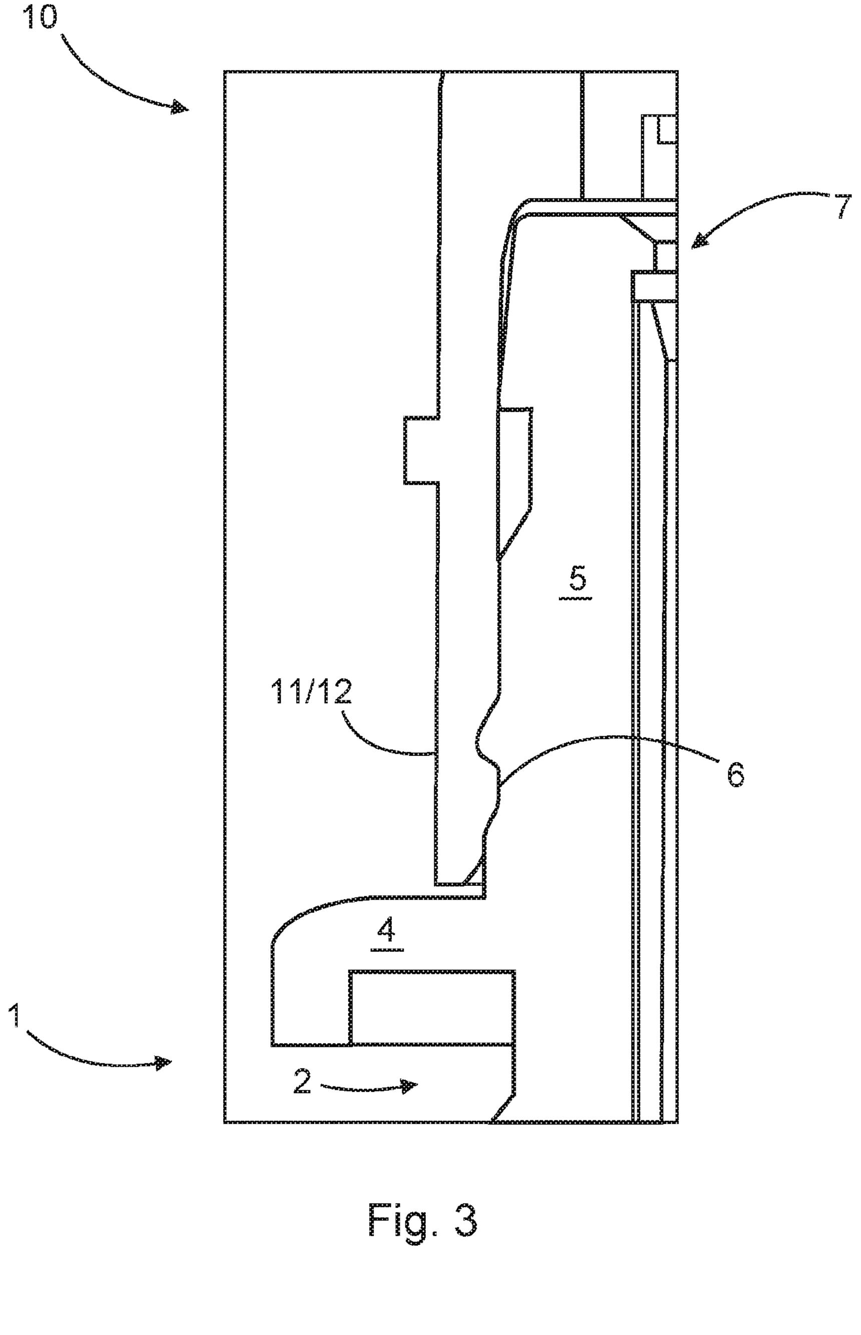

To better illustrate this, FIG. 3 shows a detail of an add-on housing 1 according to the invention and a corresponding plug-in connector 10. The plug-in connector 10 is a so-called snap-in connector. A flexible plastic molding forms the latching element 11. In the case which is shown, the latching element 11 is configured a snap closure 12. This snap closure 12 can be pushed over the holding form 6 configured as a bead by a chamfer in the region of the plug-in opening. As soon as the holding form 6 of the snap closure 12 has been overcome, the snap closure 12 locks behind the holding form 6, so that the plug-in connector 10 engages with the add-on housing 1.

Figure 4:
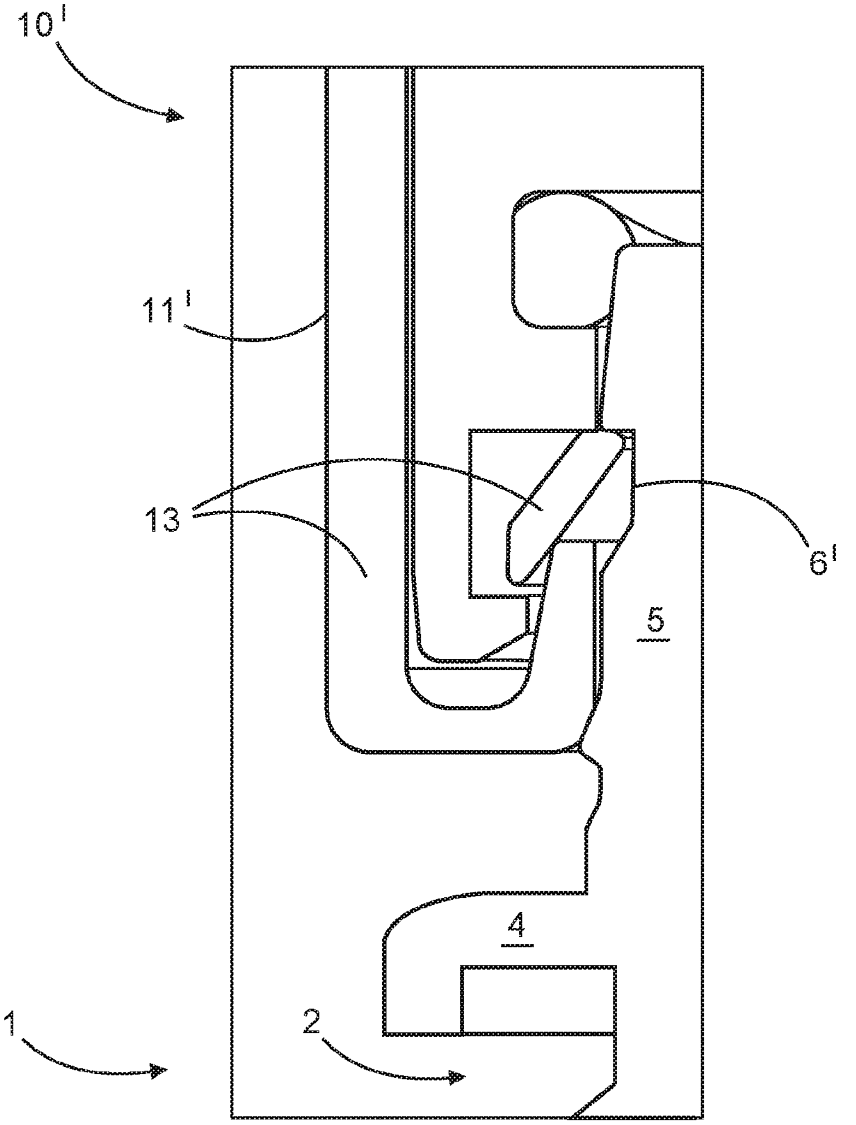

FIG. 4 shows a similar detail to that in FIG. 3, but rather than a plug-in connector 10 with a snap closure 11, a plug-in connector 10' with a latching closure 13 is shown. This latching closure 13 is an exemplary depiction of a so-called push-pull connector. A latching element of the latching closure 13 engages with the holding form 6' in this case. In this way, the plug-in connector 10' locks with the add-on housing 1.

Even if different aspects or features of the invention are shown in combination in each case in the figures, it is clear to the person skilled in the art—unless otherwise specified—that the combinations which are shown and discussed are not the only ones that are possible. In particular, units or groups of features which correspond to one another can be exchanged for one another from different exemplary embodiments. In addition, the articles "a" and "an" as used in this application and the appended claims should generally be construed to mean "one or more" unless specified otherwise or clear from context to be directed to a singular form.

LIST OF REFERENCE SIGNS

1 add-on housing
2 housing side
3 fastening form
4 flange
5 plug-in side
6, 6' holding form
7 through-hole
8 recess
10, 10' plug-in connector
11, 11' latching element
12 snap closure
13 latching closure

The invention claimed is:

1. An add-on housing (1) for an electrical plug-in connection, comprising:
- a housing side (2) with a first fastening form (3) and
- a plug-in side (5) with at least two holding forms (6, 6'), including a first holding form (6) and a second holding form (6'), for reversible fastening of a plug-in connector, wherein a flange (4) is arranged between the housing side (2) and the plug-in side (5), the flange being provided for attaching the add-on housing (1) to an appliance housing, and wherein the add-on housing (1) has a through-hole (7) along a longitudinal axis of the add-on housing (1), the through-hole (7) being designed to receive an insulating body with contact elements located therein, wherein the flange (4) is configured for attachment to an outside of the appliance housing and the first fastening form (3) is configured to securing the add-on housing (1) inside the appliance housing, wherein the first holding form (6) is a circumferential bead adapted to receive a snap closure of a snap-in connector, wherein the second holding form (6') is a circumferential groove adapted to receive a latching closure (13) of a push-pull connector, and wherein the circumferential bead is arranged between the flange (4) and the circumferential groove.

2. The add-on housing (1) as claimed in claim 1,
wherein the through-hole (7) has a further form which is configured to receive a latching element that differs from the snap closure and the latching closure.

3. A plug-in connector system comprising
the add-on housing (1) in accordance with claim 1 and
a set of corresponding electrical plug-in connectors,
wherein the set of corresponding electrical plug-in connectors includes
- the snap-in connector (10) with the snap closure (12) and
- the push-pull connector (10') with the latching closure (13), and wherein the add-on housing (1) is adapted to alternatively receive the snap-in connector (10) or the push-pull connector (10').

4. The plug-in connector system as claimed in claim 3,
wherein the add-on housing (1) is designed to receive a third plug-in connector with a third latching element,
wherein the third latching element differs from the snap closure (12) and the latching closure (13).

5. The add-on housing (1) as claimed in claim 1,
wherein the circumferential bead and the circumferential groove are separated from one another by a cylindrical portion on the plug-in side whereby the snap closure of the snap-in connector is prevented from incorrectly becoming connected to the circumferential groove.

6. The add-on housing (1) as claimed in claim 1,
further comprising a circumferential depression arranged between the circumferential bead and the flange (4).

7. The add-on housing (1) as claimed in claim 1,
wherein the add-on housing (1) is configured for being mounted to the appliance housing from the plug-in side.

8. An assembly, comprising:
the add-on housing (1) as claimed in claim 1; and
the appliance housing,
wherein the flange (4) is attached to an outside of the appliance housing and the first fastening form (3) secures the add-on housing (1) inside the appliance housing.

* * * * *